April 5, 1927.

F. W. WAPPAT 1,623,290

PORTABLE SAW

Filed July 26, 1926     2 Sheets-Sheet 1

INVENTOR

F. W. Wappat

April 5, 1927.

F. W. WAPPAT

PORTABLE SAW

Filed July 26, 1926

1,623,290

2 Sheets-Sheet 2

INVENTOR

F. W. Wappat by James C. Bradley
Atty.

Patented Apr. 5, 1927.

1,623,290

UNITED STATES PATENT OFFICE.

FRED W. WAPPAT, OF PITTSBURGH, PENNSYLVANIA.

PORTABLE SAW.

Application filed July 26, 1926. Serial No. 124,867.

Figure 1:
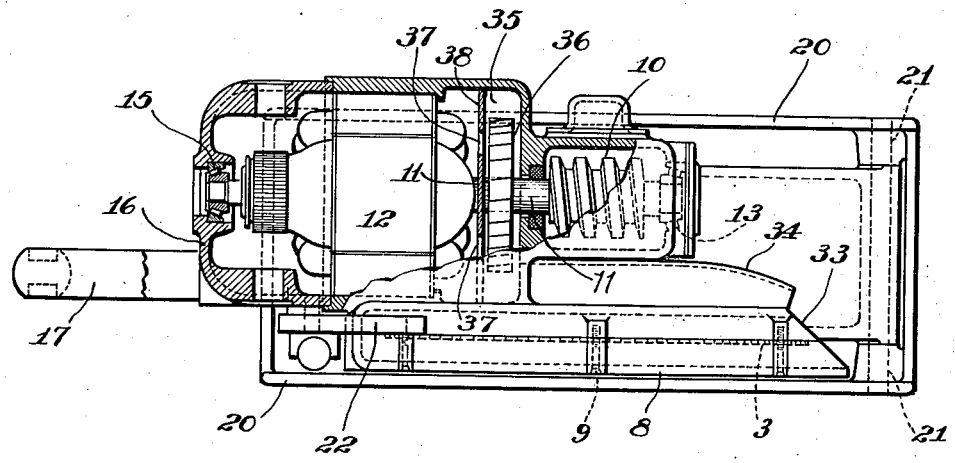
Figure 2:
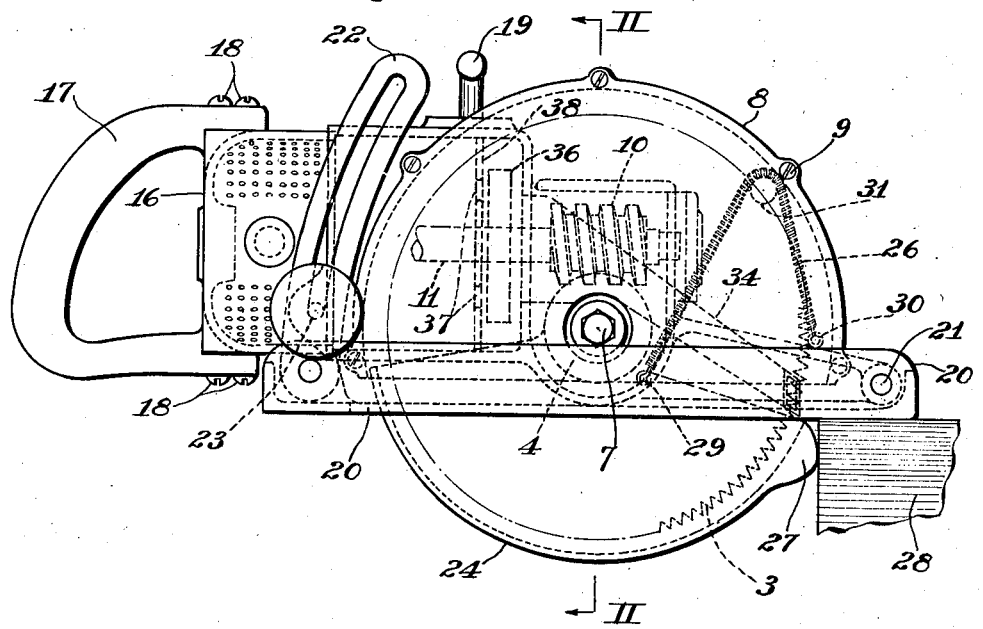
Figure 3:
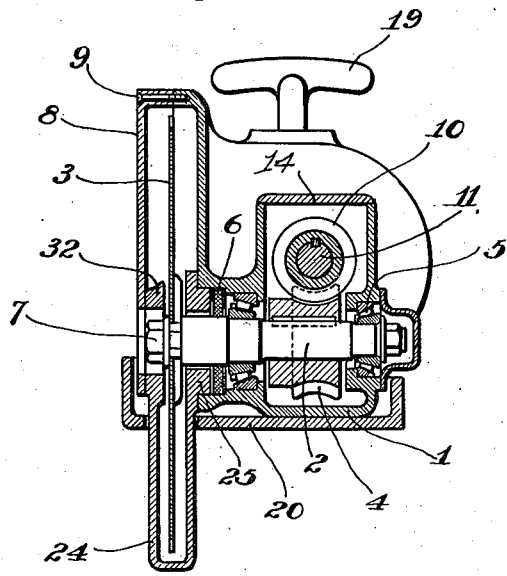

The invention relates to portable motor driven saws. It has for its primary object the provision of an improved retractable guard designed so as to make the saw safe without interfering with its operation. Further objects are the provision of an arrangement permitting the saw to be accurately guided so as to follow the line of cut which has been laid out, and the provision of means for keeping the sawdust cleared away from the line of cut. The guard means, which shrouds the lower portion of the saw, is preferably, although not necessarily pivoted concentric with the axle of the saw, and is pushed back by the work, as the saw is moved ahead. After the cut is completed and the contact of the work with the guard is released, a spring preferably carries the guard back to starting position, although other means might be provided for this purpose, which arrangement makes the saw entirely safe when not in operation. A portion of the fixed guard or casing is cut away adjacent the line of cut, so that the operator can see the forward edge of the saw and the line on the work which he is following. This permits him to guide the saw with certainty along the desired line of cut. The observation of the saw edge and line of cut, is facilitated by directing the blast from the fan, with which the machine is equipped, forwardly and downwardly against the work adjacent the line of cut, thus blowing the sawdust away from the work as fast as it is formed. One embodiment of the invention is illustrated in the accompanying drawings, wherein:

Figure 1 is a plan view of the machine, partially in section. Fig. 2 is a side elevation. Fig. 3 is a section on the line III—III of Fig. 2. And Fig. 4 is a partial perspective view showing the same in action through the cut away portion of the fixed guard or casing.

Referring to the drawings, 1 is a casting constituting the main casing or framework of the machine, in which is journaled the transverse shaft 2 carrying the circular saw 3 and the worm wheel 4. Roller bearings 5, 5 are employed for supporting the shaft, and a washer 6 of felt, or other suitable material, is interposed between the cavity which carries the gearing and that which carries the saw. The saw is clamped in position by the nut 7, and the upper portion of the cavity containing the saw is closed by the cover plate 8 secured in place by the screws 9.

The worm wheel 4 is driven by a worm 10 on the shaft 11 of the electric motor 12. An outboard bearing 13 is provided for the shaft 11, and the cavity carrying the gearing is covered by the plate 14 releasably secured in position by screws or bolts. The other end of the shaft 11 is carried by the bearing 15 mounted in the removable perforated cover plate 16, held in place by bolts. A U-shaped member 17 secured to the plate 16 by bolts 18 serves as one of the handles, while a second handle 19 is provided above the central portion of the machine, as illustrated. The rear handle is intended to be grasped by the right hand of the operator, while the top handle is grasped by the left hand.

Figure 4:
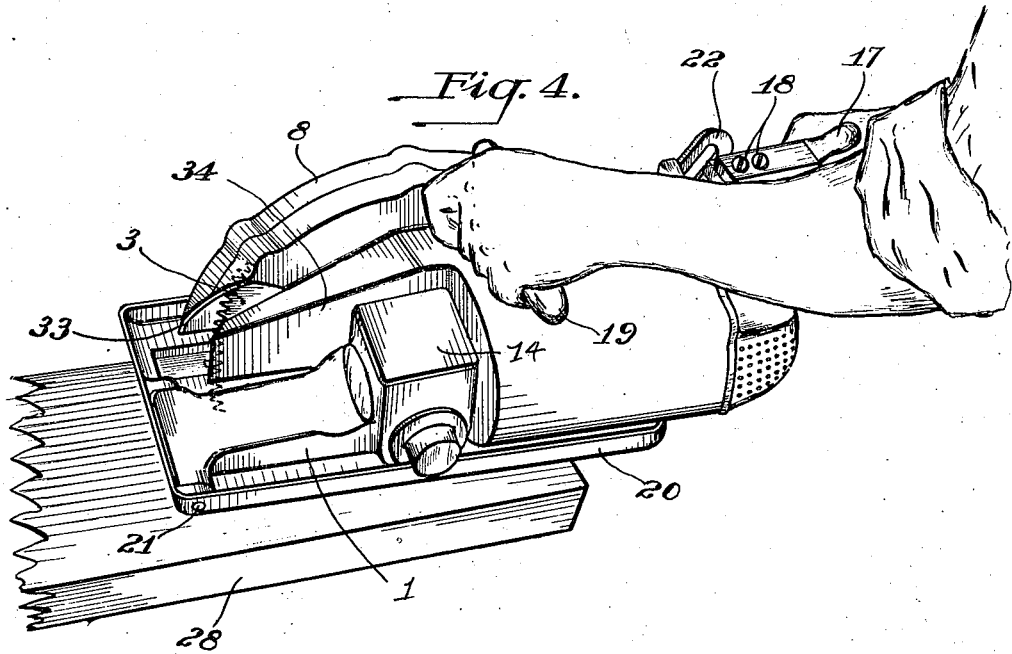

In order to regulate the depth of the cut of the saw, the guide or base plate 20 is employed, preferably U-shape in vertical cross section, as indicated in Fig. 3, and pivoted to the frame 1, as indicated at 21, Figs. 2 and 4. The rear end of the guide is provided with the slotted holding member 22, which is clamped in adjusted position by means of the stud 23 provided with a hand wheel, or crank, so that it may be tightened or loosened without a tool. By swinging the guide downward the depth of cut can be reduced to any desired degree depending upon requirements.

The guard or shield 24, which encloses the lower part of the saw constitutes one of the important features of the invention. This guard fits around the saw as indicated in Fig. 3, and is provided with a hub 25 journaled in the casting 1, so that the guard pivots about the axis of rotation of the saw. The guard is normally held yieldingly in the position shown in Fig. 2 by means of the coil spring 26, with the nose 27 of the guard in opposition to the plank 28, which is to be cut. As the saw is pushed to the right (Fig. 2) by the operator, the engagement of the nose 27 with the plank swings the guard in a clockwise direction, so that it telescopes up inside the fixed portion of the saw casing, this action being continued until the saw passes clear through the plank. When this occurs and the saw is moved away from the work, the spring 26 swings the guard back to the position of Fig. 2, so that the lower part of the saw is again shielded. The spring 26 as shown (Fig. 1) is attached at one end to a lug or projection 29 on the movable guard 24 and at the other end is secured to a similar lug 30 on the fixed guard plate 8. It passes around a boss 31, also carried by the plate 8, and as the shield is swung open, the forward end of the spring winds around the recessed part 32 of the hub of the movable guard 24 (Figs. 2 and 3). While the spring, as shown, is preferred, any other type of spring may be substituted for accomplishing the function, or other means aside from the spring may be employed for swinging the guard back to safety position. Further, the invention is not limited to use of means for automatically swinging the guard back to safety position, although this is of course preferred, and adds greatly to the convenience and safety of the machine.

In order that the operator may accurately follow the line of cut laid out on the plank or other work, the casing 1 is cut away as indicated at 33 (Fig. 4) thus exposing the saw blade and the line of cut. This observation is facilitated by providing means for blowing away the sawdust as it is formed, so that it will not accumulate and obscure the surface of the work being cut. In order to accomplish this, the downwardly inclined passage 34 (Figs. 1 and 2) leading from the fan cavity 35 is provided. Mounted upon the motor shaft 11 and lying in the cavity 35 is the fan 36, which draws air through the ports 37 in the wall 38 and discharges it through the passage 34. The ports 37 open into the cavity carrying the motor 12, so that the air which is drawn through the ports flows into the cavity through the perforated cover plate 16, and across the motor armature giving a desirable cooling effect.

What I claim is:

1. In combination in a portable saw, a motor, a circular saw driven thereby, a supporting frame for the motor and saw having a handle at its rear end, a fixed casing on the frame surrounding the edge and sides of the upper portion of the saw, a plate on the lower side of the frame pivoted at its forward end to the forward end of the frame in advance of the saw, securing means for the rear end of the plate for holding it at a plurality of points of vertical adjustment with respect to the frame, a guard or shield surrounding the portion of the saw lying below the plate pivotally supported in the casing concentric with the axis of rotation of the saw and adapted to telescope into the fixed casing when swung to the rear, and yielding means for holding the guard or shield in advanced position with its forward edge beneath the plate in position to be engaged by the work.

2. In combination in a portable saw, a motor, a circular saw driven thereby, a supporting frame for the motor and saw having a handle at its rear end, a fixed casing on the frame surrounding the edge and sides of the upper portion of the saw, a plate on the lower side of the frame pivoted at its forward end to the forward end of the frame in advance of the saw, securing means for the rear end of the plate for holding it at a plurality of points of vertical adjustment with respect to the frame, a guard or shield surrounding both sides and the edge of that portion of the saw lying beneath the plate, pivoted for movement about the axis of rotation of the saw and adapted to move into telescopic relation with the fixed casing when swung to the rear, yielding means for holding the guard or shield in advanced position, a fan operated by the motor, and means for directing a blast of air from the fan forwarding onto the work adjacent the line of cut, the said fixed casing being cut away at its forward inner edge so as to expose to the operator the edge of the saw where it engages the work, and the said plate also being cut away in advance of the saw so as to expose the upper suface of the work just in advance of said edge of the saw.

In testimony whereof, I have hereunto subscribed my name this 24th day of July, 1926.

FRED W. WAPPAT.